Jan. 14, 1969     R. D. LOWRY ET AL     3,421,411
WELD TRIMMING APPARATUS
Filed Dec. 30, 1966
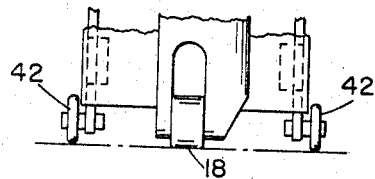
FIG 3a
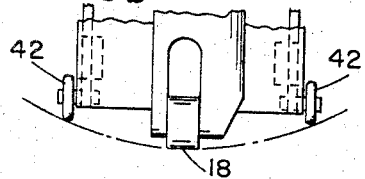
FIG 3b
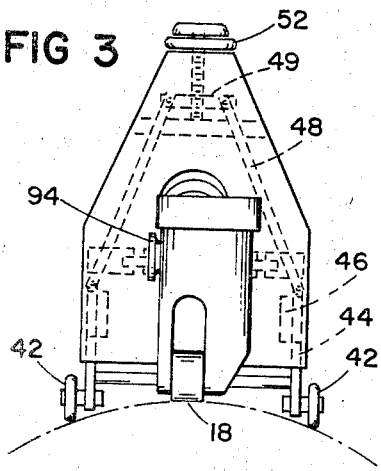
FIG 3
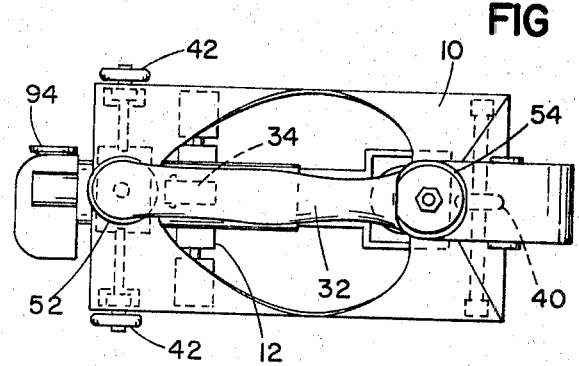
FIG 1
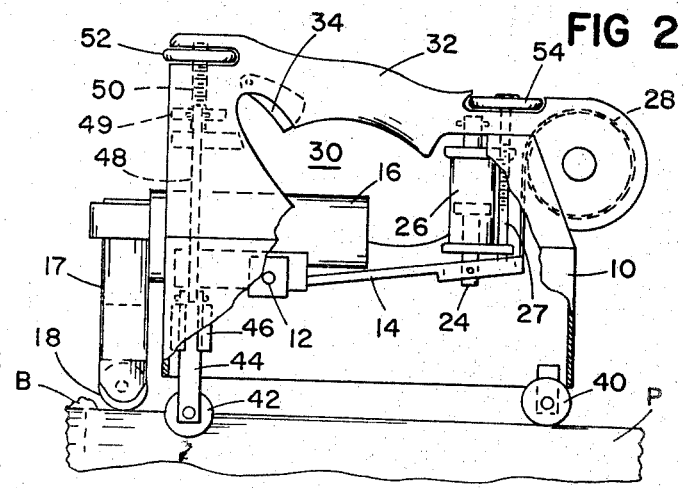
FIG 2
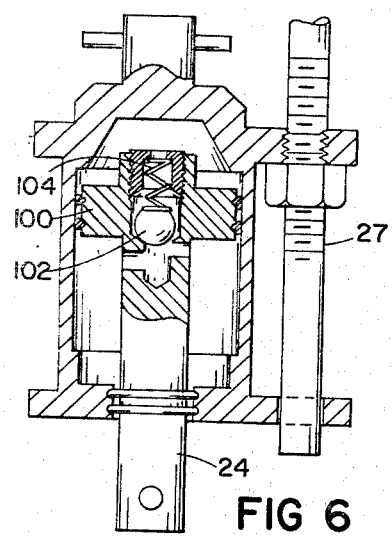
FIG 6
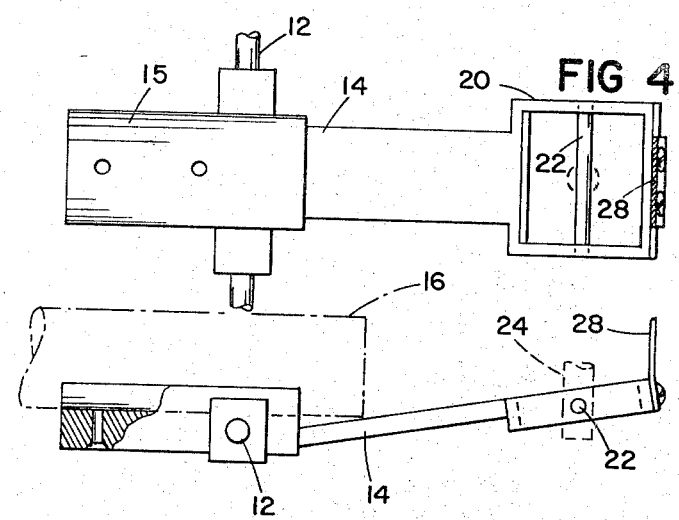
FIG 4
FIG 5

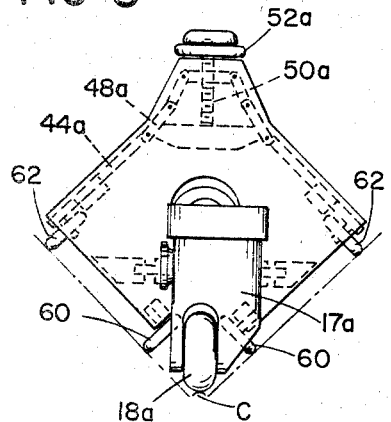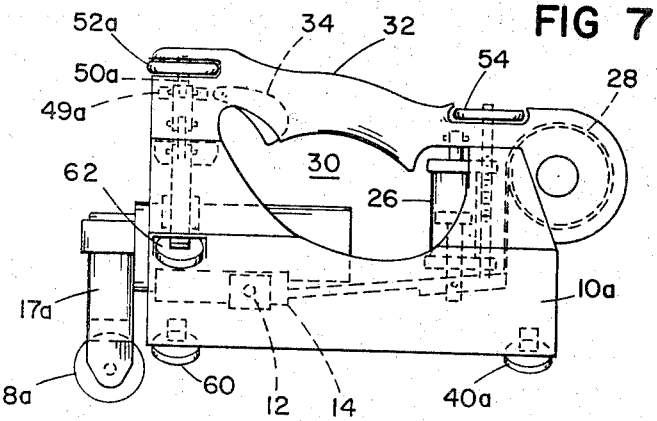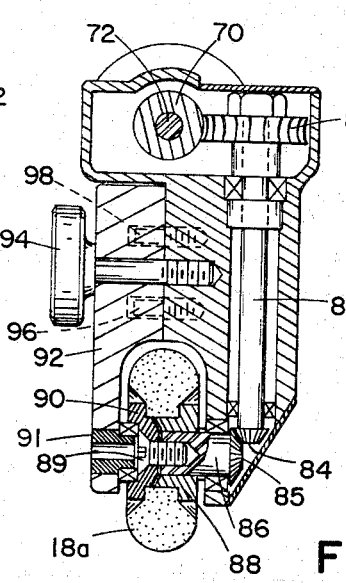

United States Patent Office 3,421,411
Patented Jan. 14, 1969

3,421,411
WELD TRIMMING APPARATUS
Robert D. Lowry and Russell B. Strout, Winchester, Mass., assignors to Lowry Development Corporation, Winchester, Mass., a corporation of Massachusetts
Filed Dec. 30, 1966, Ser. No. 606,327
U.S. Cl. 90—12                                                                             7 Claims
Int. Cl. B23c *1/20;* B23d *1/00*

ABSTRACT OF THE DISCLOSURE

Compact power driven weld trimmers have a cutting wheel, motor and drive connections mounted on a rocker arm carried by a carriage borne on adjustable wheels. The wheels are mounted on axes parallel to the cutting wheel axis for use in trimming welds between flat, concave or convex surfaces according to the particular adjustment of the wheels and are mounted on axes angularly related to the axis of the cutting wheel for use in trimming welds on the inside of variously angled surfaces, according to the adjustment of the wheels. The limit of cut is controlled by adjustment of the outer limit of rocker arm motion and the characteristics of the pivot motion of the cutting wheel are governed by imposing a constant tension on the rocker arm which is so related to the motor torque that the wheel lifts before the r.p.m. decreases below a predetermined cutting speed due to overload. The cutting wheel also has, by reason of incorporation of a dash pot arrangement, a quick up, slow down motion for reducing cutting wheel bounce.

---

This invention relates to weld trimmers and more particularly to hand-operated portable weld trimmers which may be used to reduce and smooth protruding portions of welds joining flat, curvilinear or angled surfaces.

The essential structure of devices of this invention is identical for use on welds joining surfaces of all the above types, but the understructure of the device for use in trimming straight welds on the acute angle side of surfaces differs from that used with devices intended to be used on the outside and inside of annular or longitudinal welds between curvilinear surfaces or on any flat surface.

The devices are so constructed as to permit trimming down to an exact predetermined level as a limit leaving smooth neat surfaces in contrast to the present practice of trimming such welds either with hand chisels or with portable power driven grinding wheels which are entirely hand-guided back and forth over or along the weld to be trimmed.

Devices of this invention have a carriage which is borne on wheels, some of which are adjustable and are adjusted to support the carriage upon a piece of work at such a level that a cutting wheel rotatably mounted on a rocker arm, which is resiliently urged outwardly from the carriage at a constant tension towards the work to a fixed limit of pivotal motion, may pivot away from the work as it encounters a protrusion on the surface, such as is formed by a weld, whenever the upward pressure on the cutting wheel exceeds the downwardly imposed tension. This tension is such that the wheel will yield before so much pressure is exerted on the cutting wheel as to retard its driven r.p.m. beyond a minimum chosen value, and allows maximum metal removal for the available power. The motor (air or electric) and drive mechanism are mounted on the forward end of the rocker arm for compactness, drive simplicity and inertia benefit.

A dash pot is also associated with the rocker arm to reduce chatter and gouging or chipping of the work during the downward stroke of the cutter.

In one form of the device the guide wheels on each side of the device are mounted on aligned axes, whereas in a modified form of the device, the guide wheels on each side of the device are mounted on axes which are angularly related to each other.

The device incorporates compact driving connections as well as means for readily interchanging or replacing the cutting wheel, and for changing the tension device to vary the tension.

Apparatus of the invention is shown in the accompanying drawing wherein:

FIG. 1 is a plan view of one form of the apparatus;

FIG. 2 is an end elevation of the same with certain parts broken away illustrating its mode of operation, and with its adjustable wheels set for operation on an annular weld between two convex surfaces;

FIG. 3 is a front end elevational view of the device and material being treated shown in FIG. 2;

FIG. 3a illustrates a different setting of the adjustable wheels for operating on a weld at the end or side of a flat surface;

FIG. 3b illustrates a still different setting of the adjustable wheels for operating on a weld between two concave surfaces;

FIG. 4 is an enlarged detail plan view of certain elements of the apparatus omitting the motor for clarity;

FIG. 5 is a side elevational view of the parts shown in FIG. 4;

FIG. 6 is a detailed cross-sectional view of the dash pot mechanism;

FIG. 7 is a side elevational view of a modified form of device;

FIG. 8 is a front end elevational view of the device shown in FIG. 7;

FIG. 9 is an enlarged side view of the drive mechanism; and

FIG. 10 is a cross-sectional view of the parts shown in FIG. 9 taken along the line 10—10 of FIG. 9.

In the form of the apparatus shown in FIGS. 1–6, the essential structure is shown as including a frame or casing 10 which supports a main pivot bearing 12 on which is mounted a rocker arm 14.

The forward end 15 of the rocker arm provides a support for a housing 16 containing an air motor and reduction gears as well as a forward cutter wheel supporting post 17. The cutting wheel is shown at 18 and will hereinafter be described in more detail.

The rear end of the rocker arm 14 is bifurcated at 20 and carries a cross rod 22 which is inserted through the piston rod 24 of a dash pot 26 supported within the casing for vertical adjustment on a screw 27. The rear end of the rocker arm 14 is attached to the end of a flexible steel ribbon which is coiled on a tensioned wind-up reel 28 that has the characteristic of exerting constant force in an upward direction on the rear end of the rocker arm.

Such constant force springs are well-known in the art and are readily available with a variety of tensions ranging from ¼ up to 14# when used singly and up to 28# when used dually.

The upper portion of the casing has a handle hole indicated at 30 extending beneath a handle 32 which carries near its forward end a trigger 34 which is suitably connected to the air motor to drive the cutting wheel 18.

The rear end of the casing 10 is supported on a single fixed guide wheel 40 disposed along the medial longitudinal line of the apparatus while the forward end is supported by a pair of wheels 42 carried on the bottom ends of slide bars 44 mounted in slide bearings 46 and connected by connecting linkage 48 to a single collar 49 mounted on a central adjusting screw 50 which carries at its upper end a thumb wheel 52 exposed through a slot in the casing 10 for ready peripheral contact with the thumb. Both forward wheels 42 are adjusted simultaneously and equally by reason of the symmetrical duplicate linkages.

Also shown in FIG. 2 is an exposed thumb wheel 54 at the top of screw 27 for adjusting the vertical position of the dash pot whose top chamber wall acts as a stop to limit upward movement of the dash pot piston and arm 14 and thus downward movement of cutting wheel 18.

As shown in FIGS. 2 and 3, the guide wheels 42 are in this use adjusted below the level of cutting wheel 18 so that the wheels 42 and 40 all bear against the outside of a cylindrical tank or large pipe P. The dash pot setting is then adjusted so that the cutting wheel 18 will just clear the tank surface or will clear it by any small dimension desired. When, then, the device is moved along the tank surface and the cutting wheel 18 encounters the protruding portion B of an end to end annular weld, if the wheels 40 and 42 are kept hand-pressed against the pipe, the amount of tension imposed by the coil spring 28, taken with the weight of the rocker arm, motor and post 17 assembly, is such that the vertical position of the cutting wheel with respect to the axes of wheels 42 will increase automatically before the load on the cutter wheel will decrease the cutting wheel r.p.m. at the given motor torque below a designed minimum. The cutting will thus continue at least at minimum speed with back and forth motion of the device until the weld is cut down to the level for which the cutter wheel has been set as a limit of its downward motion by the adjustment of the dash pot 26, or to any intermediate desired amount by a succession of mound reducing strokes.

In FIG. 3a, the wheels 42 are adjusted to run in the same plane as the rear wheel 40 and in substantially the same plane as the cutting wheel 18. This permits operation on a weld protruding from a flat surface.

In FIG. 3b, the level of the wheels is above the cutting plane of wheels 42 for operating on a concave surface.

FIGS. 7 and 8 disclose a similar device mounted in a different form of casing 10a with a different understructure. Here the wheels 40a at the rear are mounted on fixed axes extending at approximately right angles to one another whereas there are two sets of wheels 60 and 62 at the forward end of the device. The lower wheels 60 are mounted on fixed axes also at right angles to each other and in alignment with the rear wheels 40a. The other forward wheels 62 are mounted on axes which are parallel to the axes of the wheels 60 but are adjustable outwardly and inwardly simultaneously and equally by reason of the mounting of the axes on duplicate slide rods 44a connected with duplicate connecting links 48a to a single collar 49a on the adjusting screw 50a. The other parts are similar to those shown in FIGS. 1–6 except for the length of the post 17a.

In FIG. 8 the device is shown operating on a weld burr C formed at the right angled intersection of two work surfaces with the wheels 60 and 62 bearing against the angled surfaces, the cutting just having been started.

The construction of the post 17a which is substantially identical with that used for the post 17 is shown in FIGS. 9 and 10. A gear 70 on motor shaft 72 meshes with a gear 80 on a vertical shaft 82 which through bevel gears 84 and 85 drives lower cross shaft 86 upon which is mounted an inboard clamp 88 and to which is attached by a cross screw 89, an outboard cutter clamp 90 which also forms a seat for a removable outboard bearing 91 held against the clamp 90 by a retainer plate 92 which is fastened against the post by a hand screw 94 with the plate 92 being centered by dowel pins 96, 98. The dash pot as shown in FIG. 6 is one having a slow up and fast down piston travel and includes a piston 100 provided with a ball valve 102 urged downwardly by spring 104 against an imperfect seat. Upward pressure exerted against the piston rod 24 by the tension coil 28 through arm 14 will cause the oil in the upper chamber above the piston rod to proceed only slowly in a bleeding fashion to the lower chamber due to the imperfact ball seat thus resisting the upward movement, but transmittal of downward motion to the piston rod 24 by rear end of the rocker arm 14 will allow fluid from the lower chamber to pass upwardly readily and quickly through the ball valve to the upper chamber. Bouncing on the downward stroke is thus minimized.

The cutting wheel 18, 18a may be of any shape, but is shown as flat-surfaced at 18 and arcuate-surfaced at 18a, preferably being a carbide cutter with sharpened cutting edges. However, abrasive grinding wheels may also be used. The tensioning coil also may be replaced to change the value of the constant tension depending upon the hardness of the weld material to be removed and the coarseness of the cutting surface of the cutter 18.

The air motor is preferably ½ horsepower providing 10,000 r.p.m. on the one inch diameter wheel in FIGS. 1–6 and, through different reduction giving 5,000 r.p.m. on a 2-inch cutter for the device of FIGS. 7 and 8. Desirably the peripheral speeds range from 1000–3000 feet per minute.

What is claimed is:
1. Portable weld trimming apparatus comprising
    a frame,
    forward and rear wheels mounted on said frame supporting said frame for longitudinal movement as said wheels rotate in frictional engagement with an underlying surface,
    a rocker arm intermediately pivoted within said frame,
    a rotary cutter mounted on the forward end of said rocker arm for rotation about an axis extending transversely to said frame,
    a motor and intermediate gearing mounted on said rocker arm for driving said cutter,
    means for adjusting the level of said forward wheels with respect to the pivot of said rocker arm; and
    means at the back end of the rocker arm urging the forward end of said rocker arm yieldingly downward to a predetermined bottom level with respect to the pivot of said rocker arm.
2. Apparatus as claimed in claim 1, having means for varying said predetermined bottom level of downward forward end motion of said rocker arm.
3. Apparatus as claimed in claim 2, wherein said varying means includes a vertically adjustable dash pot having a piston connected to the rear end of said rocker arm, the limit of the upper stroke of said piston varying with the vertical adjustment of said dash pot.
4. Apparatus as claimed in claim 1, wherein the urging means interposes resistance to the upward motion of said cutter with a constant force throughout its upward pivoting stroke.
5. Apparatus as claimed in claim 1, wherein said urging means exerts a constant force against upward motion of said rocker arm throughout its pivoting stroke, and wherein said force is less than an upward force exerted by any overload on said cutter sufficient to reduce rotation of said cutter by said motor below a predetermined r.p.m.

6. Apparatus as claimed in claim 1, having in addition dash pot means connected to the rear end of said rocker arm to permit said cutter to pivot upwardly resisted only by said urging means but interposing yielding resistance to return of said cutter downwardly by said urging means.

7. Apparatus as claimed in claim 1, wherein said wheels include a forward pair mounted on angularly related axes so that their peripheral surfaces will roll substantially perpendicularly on angularly related surfaces when said cutter is operating against a weld protruding from the inner intersection of said angularly related surfaces.

References Cited

UNITED STATES PATENTS

| 1,116,158 | 11/1914 | Swain et al. | 90—12 |
| 1,715,949 | 6/1929 | Rich | 90—12 X |

FOREIGN PATENTS

| 472,918 | 4/1951 | Canada. |

ANDREW R. JUHASZ, *Primary Examiner.*

G. WEIDENFELD, *Assistant Examiner.*

U.S. Cl. X.R.

90—24